June 29, 1965     J. L. CONNER     3,191,711
TRACTION SYSTEM FOR AUTOMOTIVE DEVICES UTILIZING
REACTION TORQUE TO IMPROVE TRACTION Filed Aug. 16, 1963     2 Sheets-Sheet 1

INVENTOR
JAMES LEON CONNER

BY

ATTORNEY

June 29, 1965   J. L. CONNER   3,191,711
TRACTION SYSTEM FOR AUTOMOTIVE DEVICES UTILIZING
REACTION TORQUE TO IMPROVE TRACTION
Filed Aug. 16, 1963   2 Sheets-Sheet 2

INVENTOR
JAMES LEON CONNER

BY
ATTORNEY 3,191,711
TRACTION SYSTEM FOR AUTOMOTIVE DEVICES UTILIZING REACTION TORQUE TO IMPROVE TRACTION
James L. Conner, 204 Northview Road, Bel Air, Md.
Filed Aug. 16, 1963, Ser. No. 302,616
2 Claims. (Cl. 180—71)

This invention relates to vehicular motion and to vehicular structure subjected to such motion, including not only at the instant of starting or the sudden change from immobility to motion, but also the change or acceleration from one rate of speed to another higher speed.

The invention relates particularly to the manner of mounting vehicular structure on its running gear including that subjected to sudden starting or rapid acceleration as in drag racing or other competition wherein vehicles of conventional or ordinary construction are less suitable for the intended use and due to their construction such vehicles allow a substantial waste of energy by the needless spinning of the wheels due to inertia.

Frequently operators of certain motor vehicles or automobiles claim that the vehicles in which they are interested are superior to those of others, and this results in contests such as racing to determine the issue. Consequently there occur comparative tests of starting, acceleration, and the like performance tests between vehicles, some of which are less suited for such tests than others, and as a result a great amount of wheel spinning and instability occurs resulting in the loss of power in the desired direction and consequently waste of energy. Larger tires with greater weight have been employed to obtain greater traction with little accomplished.

It is an object of the invention to provide simple, inexpensive, easily applicable and removable mechanism for improving the utilization of power effectively and efficiently in starting, accelerating, and other operation of a motor vehicle with most effective traction without sidesway or loss of stability.

Another object of the invention is to provide mechanism by which with the least alteration or modification of the vehicle to which applied the power of the motor or engine of a motor vehicle may be most effectively transmitted to the driving wheels with minimum slippage, spinning or skidding.

Figure 1:
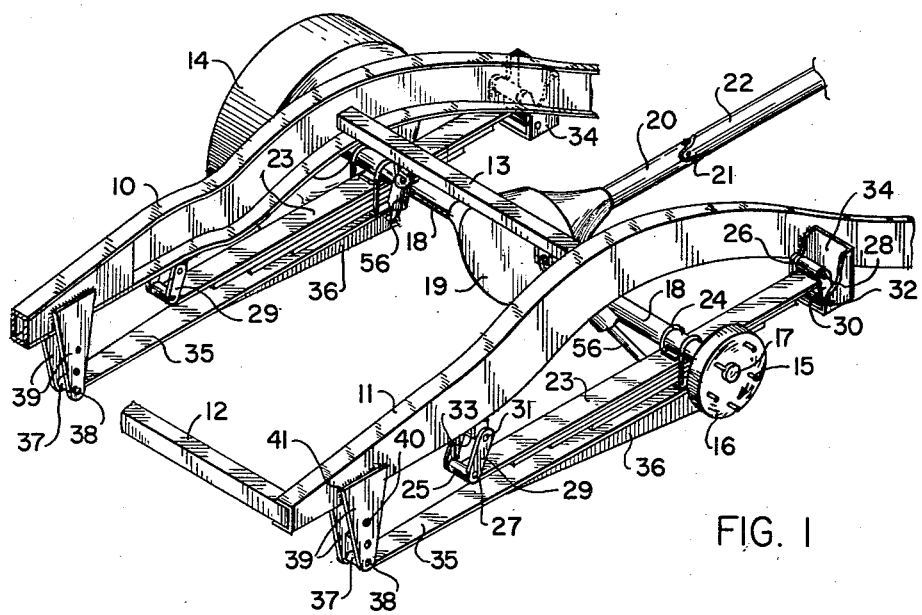
Figure 2:
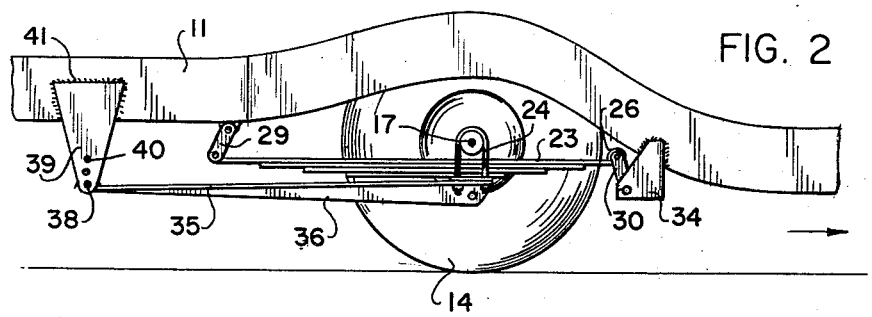
Figure 3:
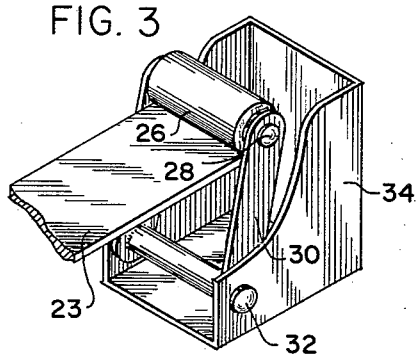
Figure 4:
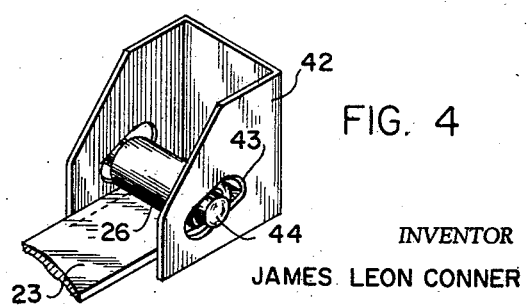
Figure 5:
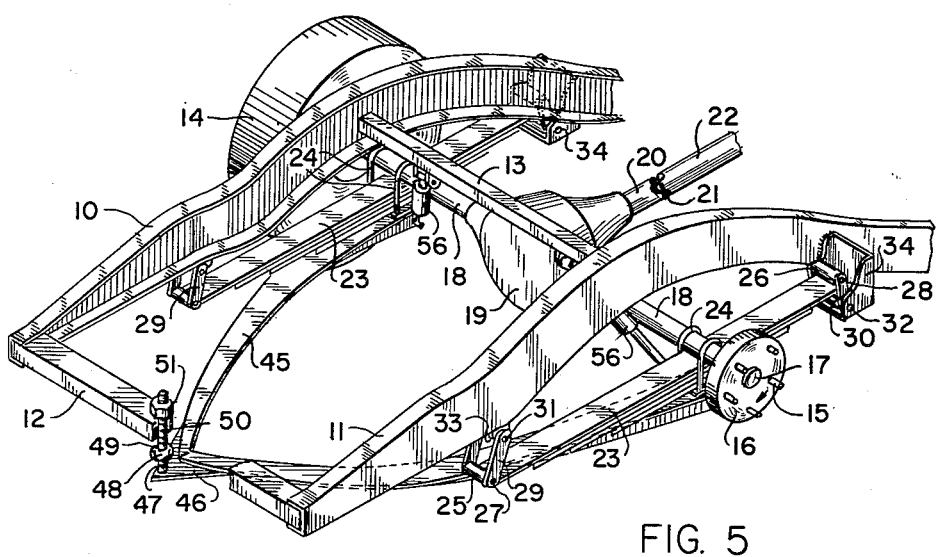

Other objects and advantages of the invention will be apparent from the following description taken in conjunction with the accompanying drawings wherein:

FIG. 1 is a fragmentary detail perspective illustrating one application of the invention;

FIG. 2, a side elevation thereof;

FIGS. 3 and 4, perspectives of mounting brackets used in conjunction with the structures of FIGS. 1 and 2;

FIG. 5, a fragmentary detail perspective of another form of the invention; and

Figure 6:
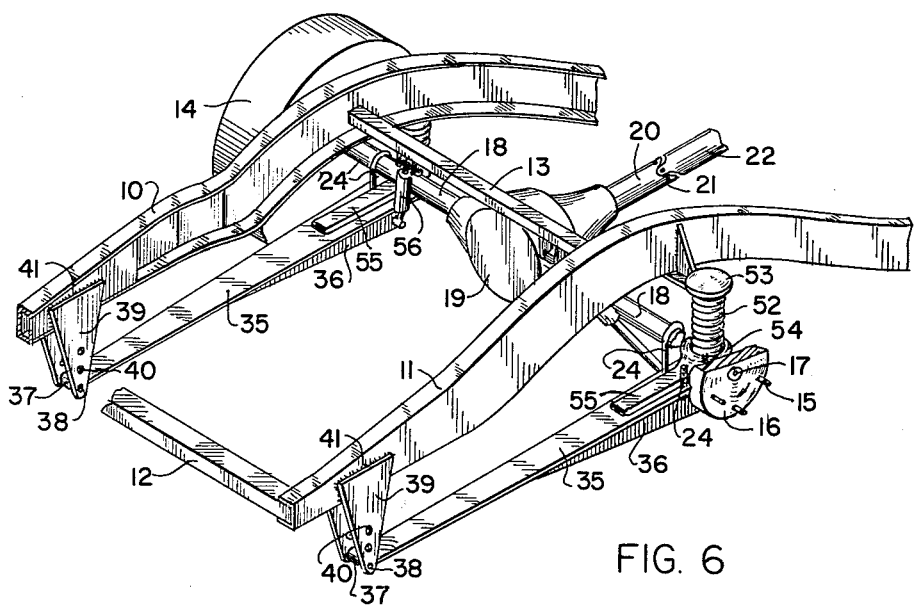

FIG. 6, a still further modification applicable to suspension mechanism incorporating spring coils.

Briefly stated, the invention is a traction device which can be added to the spring suspension of an automobile to change the relationship of the parts which constitute the suspension mechanism, whether leaf spring, coil, or other type, in a manner that maximum force is transmitted with minimum usual ineffectiveness and loss due to spinning, sideswaying, and other unstable operation, the worthwhile change in operation being by providing motion permitting connections at the front of the spring suspension and a spacing connector at the rear whereby in addition to the usual or expected torque produced there will be a reaction torque transmitted as a downward force to the rear portion of the vehicle thus bringing about a lowering of the vehicle frame relative to the wheels and a more intimate relation between the wheels and the surface on which they are supported with minimum waste of power as compared with far greater waste heretofore experienced.

With continued reference to the drawings, parallel frame or chassis members 10 and 11 are adapted to carry the body or upper portion of the vehicle not shown. The frame or chassis members 10 and 11 include cross members 12 and 13 which provide a solid support for the body or upper portion of the vehicle.

The vehicle is supported at one end on driving wheels 14 detachably connected by bolts or studs 15 to drums 16 mounted on driving shafts or axles 17 in housings 18 attached to a differential housing 19 where the differential drive to the axles is accomplished by means of a driven shaft 20 and universal joint 21 and a driving shaft 22 receiving power from any desired source such as the engine or power plant of the vehicle.

Between the housings 18 and the frame members 10 and 11 are spring suspensions or mountings including leaf springs 23 having an intermediate connection by U-bolts 24 with the axle housings 18. The extremities of the leaf springs terminate in tubular portions 25 and 26 in which are received bolts 27 and 28 connected by links 29 and 30 and bolts 31 and 32 respectively to mounting members 33 and 34 attached to the frame members 10 and 11.

In construction of the type indicated there is a reaction to the torque applied to the rear axle 17 which tends to cause rotation of such differential housing in a direction opposite that of the axle. This ever present reaction torque on the housing 18 not only serves no useful purpose but frequently is a nuisance. In substance the reaction torque during pronounced acceleration causes bending or wrap-up of the rear springs which causes reduction of the stability of the vehicle and erratic rear wheel pop or bounce resulting in extreme loss of traction by either or both driving wheels and this may cause sidesway and generally difficult handling.

The present invention does not eliminate reaction torque but utilizes it in a manner substantially to improve traction. In the present invention reaction torque during acceleration forwardly is transmitted through rigid reaction arms 35 to produce a downward force on brackets 39 by means of the pivot bolt 38, such downward force being equal to the reaction torque divided by the effective length of the reaction arm 35. The arm 35 is a relatively stiff or nonflexible bar including a reinforcing and rigidifying flange 36 attached to the axle housing in any desired manner as for example by welding or by U bolts and nuts 24.

The rear end of the bar 35 is provided with a sleeve 37 in which is received a spring bolt 38 of one of a pair of brackets 39, one on each side of the frame 11. The brackets 39 have spaced openings 40 therein to provide relative adjustment between the supporting frame 11, to which the brackets 39 are attached by welding 41 or the like. Thus, when the axle 17 is driven and begins to rotate in a clockwise direction as in FIG. 2 the bar 35 tends to rotate in a counterclockwise direction causing the rear of the vehicle to move toward instead of away from a supporting surface therefor. It will be apparent that the front end of the vehicular spring is mounted for very substantial movement instead of the front end of the spring being substantially fixed and immobile relative to the frame members.

Instead of the mounting member 34 a modified type of mounting member 42 may be employed having elongated slots 43 which permit reciprocation therein of the roller 44. The roller 44 is received within a sleeve 26 carried on the end of the leaf spring 23. The movement of the shaft 44 within the slot 43 permits the spring to move in a generally similar manner to that of FIG. 3.

In FIG. 5 is disclosed a somewhat modified form of construction in which instead of the reaction members 35 in the preceding figures, reaction members 45 are employed which curve convergingly and are joined to a connector 46 which carry a stud 47 and a ball 48 which fit into a socket 49 on a bolt 50 attached to the frame cross member 12 and secured thereto by means of a bolt 51. Otherwise, the structure and the operation are the same as that of the preceding figures.

In FIG. 6 is disclosed one manner of application of the invention to certain types of running gear where the suspension mechanism includes coil springs 52. In this type of construction the spring coils have their upper ends seated in brackets 53 welded or otherwise attached to the frame members 11 and 12. The lower end of the spring coil 52 seats in a socket member 54 resting on a reinforcing member 55 overlying a reaction member 35 and fastened to the housing 18 by means of U-bolts 24. The front of the member 35 attaches to brackets 39 like those of FIGS. 1 and 2. Thus, it will be apparent that the invention may be applied to structures of different types. Shock absorbers 56 of conventional construction may be employed for the usual purposes.

In the application of the present invention the replacement by the bracket 34 of the usual or stock anchor bracket at the front end of the rear leaf spring 23 allows greater freedom of movement of the front end of the spring as illustrated in FIGS. 3 and 4, both of which have been found to operate satisfactorily. The bracket 39 rearwardly of the opposite end of the leaf spring is welded or otherwise suitably secured in place and is of a length that it will extend an appreciable distance downwardly or as much as road clearance will permit under conditions of full acceleration with the rear of the car at a lower level or squatted in order that the long horizontal torque arms or reaction members 35 and 45 which extend rearwardly from the rear axle will connect to the respective brackets at the lowest practical point.

With the stock anchor bracket replaced, the front spring bracket is relieved of the task of driving the car forward and the leaf spring 23 is now free flowing. The long horizontal arms 35 and 45 serve two important functions, namely, the opposing torque transmitted to the rear axle housing by the ring and pinion gears is transmitted to the automobile frame in the form of a downward force at the rear of the vehicle and the vehicle is propelled forward by the force transmitted through the torque arms to the pin which connects the horizontal torque arms to the rear bracket welded to the frame.

As indicated the rear bracket which connects the lateral arms to the frame should be as long as possible in order to move the point through which the vehicle is propelled as far below the center of gravity of the vehicle as is feasible. This gives the vehicle a greater tendency to shift over backwards and therefore shifts the vehicular weight to the rear wheels during acceleration.

For any given conventional automobile having rear leaf springs the above construction will provide maximum weight transfer to the rear and therefore maximum traction potential to the rear wheels. Road stability is greatly increased when the rear wheels are spinning under hard acceleration or when the vehicle is traveling at a high rate of speed because the vehicle body and the chassis cannot rock or sway from side to side relative to the rear axle. Where coil spring suspensions are employed, the bars which extend rearwardly are attached in the manner indicated similar to that of the leaf spring setup, then the stock lower arms forwardly of the axle are removed or at least modified to allow the proper suspension.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. The combination in an automotive vehicle having a frame, spaced driving wheels, driving axles connected to said wheels, rigid means rotatably mounting said wheels in spaced axial relation to each other, spring suspension means mounted between said rigid wheel mounting means and said frame, an elongated relatively rigid reaction member fixedly attached to said rigid wheel-mounting means adjacent to and extending rearwardly of each of said wheels, each of said elongated reaction members being of a length such that the rear end thereof extends in the proximity of the rear end of said frame, means connecting said rear end of each of said elongated reaction members to fixed pivots on said frame whereby when sudden rotative force is applied to the wheels through said driving axles said rigid reaction members will by the forces then acting on said vehicle frame cause the rear end of the vehicle frame to lower thereby exerting downward levered pressure on the vehicle wheels to provide greater traction between the rear wheels of the vehicle and the roadway.

2. The combination of an automotive vehicle having a frame, spaced driving wheels, axles connected to said driving wheels, a housing about said axles, spring suspension means mounting said frame on said housing, said spring suspension mean including leaf springs disposed lengthwise of said frame and transversely of said axles, a relatively stiff bar fixed to said housing at each side of said spring suspension means including the forward end fixed to the intermediate portion of the leaf spring in the general location of the attachment of said leaf spring to the housing, each of said bars being of a length that its rear end extends rearwardly beyond the rear end of the associated leaf spring, means connected with the rear end of said bars to a fixed pivot on said frame whereby when sudden rotative force is applied to said driving wheels through said axle said bar will by the torque imparted to said housing cause the rear end of the frame to lower and provide greater weight and consequent traction on the rear wheels of the vehicle relative to the roadway.

References Cited by the Examiner

UNITED STATES PATENTS

| | | | |
|---|---|---|---|
| 926,176 | 6/09 | Daimler. | |
| 1,881,408 | 10/32 | LeMoon | 267—67 |
| 1,903,136 | 3/33 | Reid | 267—66 X |
| 2,692,778 | 10/54 | Stump | 267—66 X |
| 2,699,935 | 1/55 | Meier | 267—66 |
| 2,763,332 | 9/56 | Tatum | 180—85 |

FOREIGN PATENTS 738,627  10/55  Great Britain.

BENJAMIN HERSH, *Primary Examiner.*

A. HARRY LEVY, PHILIP ARNOLD, *Examiners.*